United States Patent
Pereira et al.

(10) Patent No.: US 6,776,205 B2
(45) Date of Patent: Aug. 17, 2004

(54) TIRE CROWN REINFORCEMENT WITH SPECIFIED RUBBER DECOUPLING LAYERS

(75) Inventors: Pedro Costa Pereira, Clermont-Ferrand (FR); Yves Herbelleau, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/823,542

(22) Filed: Mar. 30, 2001

(65) Prior Publication Data

US 2001/0020507 A1 Sep. 13, 2001

Related U.S. Application Data

(63) Continuation of application No. PCT/EP99/07263, filed on Oct. 1, 1999.

(30) Foreign Application Priority Data

Oct. 2, 1998 (FR) .............................................. 98 12594

(51) Int. Cl.[7] .............................. B60C 3/04; B60C 9/18; B60C 9/20; B60C 9/22; B60C 9/30
(52) U.S. Cl. ........................ 152/454; 152/455; 152/526; 152/531; 152/532; 152/537
(58) Field of Search ................................. 152/537, 532, 152/526, 455, 531, 454

(56) References Cited

U.S. PATENT DOCUMENTS

| | | | |
|---|---|---|---|
| 2,541,506 A | * | 2/1951 | Cuthbertson et al. ... 152/532 X |
| 3,231,000 A | | 1/1966 | Massoubre |
| 3,392,774 A | | 7/1968 | Le Bosse |
| 4,140,166 A | * | 2/1979 | Koyama et al. ............ 152/537 |
| 4,425,953 A | | 1/1984 | Rohde et al. |
| 4,795,523 A | | 1/1989 | Laurent et al. |
| 4,804,436 A | | 2/1989 | Debroche et al. |
| 4,838,330 A | | 6/1989 | Takayama |
| 4,895,692 A | | 1/1990 | Laurent et al. |
| 4,963,207 A | | 10/1990 | Laurent |

FOREIGN PATENT DOCUMENTS

| | | | |
|---|---|---|---|
| EP | 0066225 A2 | 12/1982 | |
| EP | 0401444 A2 | 12/1990 | |
| EP | 0760296 B1 | 3/1997 | |
| EP | 0 865 942 A2 | * 9/1998 | ................. 152/537 |
| GB | 1462656 | 1/1977 | |
| JP | 08142607 A | * 6/1996 | ................. 152/537 |

OTHER PUBLICATIONS

Mechanics of Pneumatic Tires, ed. Samuel Clark, Aug. 1981, U.S. Department of Transportation, p. 27.*
Patent Abstract JP 60 015203, published Jan. 25, 1985 (English text), Bridgestone Corp.
Patent Abstract JP 05 319016, published Dec. 3, 1993 (English text), Bridgestone Corp.
Patent Abstract JP 07 186614, published Jul. 25, 1995 (English text), Bridgestone Corp.
U.S. application Ser. No. 09/823,543, filed Mar. 30, 2001 for Pereira et al. "Radial Tire Crown Reinforcement".

* cited by examiner

Primary Examiner—Adrienne C. Johnstone
(74) Attorney, Agent, or Firm—Burns, Doane, Swecker & Mathis, LLP (57) ABSTRACT

A tire having a crown, two sidewalls and two beads, a carcass reinforcement anchored in the two tire beads and a belt reinforcement, the belt reinforcement including at least two superposed reinforcing plies formed by cords parallel in each ply and criss-crossed from one to the other forming with the circumferential direction angles ($\alpha$, $\beta$) ranging between 10° and 70° and characterized in that, there is provided, between the two superposed reinforcing plies, at least two axially adjacent rubber decoupling layers with different mechanical properties and in that each of the two rubber decoupling layers is in contact with the cords of the two superposed reinforcing layers.

20 Claims, 6 Drawing Sheets

TIRE CROWN REINFORCEMENT WITH SPECIFIED RUBBER DECOUPLING LAYERS

This is a continuation of pending application PCT/EP99/07263, filed Oct. 1, 1999.

BACKGROUND OF THE INVENTION

The invention concerns the crowns of tires and, notably, the rubber decouplings placed between the reinforcing plies of those crowns.

The crowns of tires usually comprise a carcass reinforcement, a belt reinforcement with usually at least two superposed reinforcing plies formed by cords parallel in each ply and criss-crossed from one ply to the other and a tread.

The crowns of tires are in contact with the road and must transmit to the wheel, by means of the sidewalls and beads, the transverse stresses necessary to steer the vehicles. For the road performance of vehicles to be satisfactory, it is necessary for the crowns to be very rigid relative, for example, to the sidewalls. A permanent objective is to try to obtain such high rigidity as simply and economically as possible.

It is well known that the rubber decouplings of belt reinforcing cords contribute to obtaining high rigidity. That is why those rubber decouplings usually have a high modulus of elasticity. On the other hand, the rubber decouplings in contact with the cords of carcass reinforcements usually have a low modulus of elasticity because they must withstand without damage the high deformations they undergo in the sidewalls of the tires.

On the other hand, a great deal of research is being conducted to reduce the gasoline consumption of road vehicles. For that purpose, emphasis is on the design of tires having a very low rolling resistance, while maintaining the other properties of wear, adherence, performance, etc., as economically as possible.

SUMMARY OF THE INVENTION

The object of the invention is a tire whose crown structure is improved in order to facilitate its manufacturing process and thus make it more economical, as well as to improve its quality and its performances.

The object of the invention, according to a first variant, is also an embodiment intended mainly to lower the resistance to rolling and, according to a second variant, an embodiment intended to improve the rigidity of the crown.

In what follows, "cord" is understood to mean monofilaments as well as multifilaments, or assemblages like cables, yarns or even any type of equivalent assemblage, whatever the material and treatment of those cords, such as surface treatment or coating, notably, of rubber having undergone the start of vulcanization or pre-sizing to promote adhesion on the rubber.

The "rubber decoupling layer" between two reinforcing plies is understood to mean a rubbery compound in contact with the reinforcing plies of at least one of the two plies, adhering to the latter and filling the interstices between adjacent cords. In current industrial practice, the reinforcing plies are made by application of calendered plies; consequently, between two given reinforcing plies, two rubber decoupling layers are used, each being in contact with the cords of one of the two plies and having the same composition for the different zones of the tire.

"Contact" between a cord and a rubber decoupling layer is understood to mean that at least one part of the outer circumference of the cord is in close contact with the rubbery compound constituting the rubber decoupling. If the cord contains a covering or coating, the term contact means that the outer circumference of that covering or coating is in close contact with the rubbery compound constituting the rubber bonding.

"Modulus of elasticity" of a rubbery compound is understood to mean a secant extension modulus obtained on a uniaxial extension deformation in the order of 10% after three cycles of accommodation and at ambient temperature.

Upon a sinusoidal stress of a rubbery compound, for example, with deformation applied, $\epsilon^*=\epsilon_0 e^{j\omega t}$, the steady state response of that compound is also sinusoidal and dephased by an angle $\delta$, $\sigma^*=\sigma_0 e^{j(\omega t+\delta)}$. A complex modulus $G^*=\sigma^*/\epsilon^*=\sigma_0/\epsilon_0 e^{j\delta}=G'+jG''$ is defined, with $\sigma$ the stress in MPa. G' is called "dynamic modulus" and G'' is called dynamic modulus of loss. The tan $\delta=G''/G'$ ratio is called damping ratio. The measurements are made on alternate shear stress at a frequency of 10 Hz, at a temperature of 60° C. and at a peak-to-peak dynamic deformation of 10%.

The tire according to the invention comprises a crown, two sidewalls and two beads, a carcass reinforcement anchored in the two beads and a belt reinforcement, that belt reinforcement comprising at least two superposed reinforcing plies formed by cords parallel in each ply and crisscrossed from one ply to the other by forming angles ($\alpha$, $\beta$) with the circumferential direction ranging between 10° and 70°. That tire is characterized in that, between the two superposed reinforcing plies, at least two rubber decoupling layers of different mechanical properties are placed axially adjacent, and in that each of said two rubber decoupling layers is in contact with the cords of said two superposed reinforcing plies.

That tire has the advantage of having only one single rubber decoupling layer between the two crown reinforcing plies in any circumferential section (outside of the zones of transition between the two adjacent rubber decoupling layers). This layer can have different properties in different circumferential sections, for example, in the center and on the edges of the plies. That makes it possible to adapt the nature and the properties of the single layer to the objective of the tire designer.

The rubber decoupling layers are preferably made by a spiral winding of a rubbery compound section directly on the cords of the radially inner reinforcing ply. That direct application of rubber decoupling layers on the cords of the reinforcing plies simplifies manufacture of the tire.

A first decoupling layer is placed between the center part of the two superposed reinforcing plies and a second decoupling layer is placed on at least one side of the first layer and extends at least as far as the corresponding lateral ends of the two superposed reinforcing plies. In a particular embodiment, a second decoupling layer extends axially more than 3 mm beyond a lateral end of the cords of a reinforcing ply.

In a first embodiment, the ratio between the moduli of elasticity of the second layer and first layer ranges between 0.05 and 0.8 and preferably between 0.4 and 0.6.

In that embodiment, the modulus of elasticity of the rubber decouplings between the two reinforcing plies consisting of crossed cords is markedly less in at least one lateral zone of the tire crown than that of the rubber decouplings in the center zone of the crown. This has the advantage of making substantial gains in running resistance possible by maintaining the drift thrust and rolling lifetime properties at totally acceptable levels.

The second rubber decoupling layer preferably has a damping ratio tan δ below 0.08. Such a layer is very easily hysteretic and markedly contributes to the gain in running resistance of the tire concerned.

It is also possible, in order to preserve or improve the drift thrust and lifetime properties, to add, on the same side as the second rubber decoupling layer, an additional reinforcing ply consisting of cords oriented in the circumferential direction and extending axially roughly like the second rubber decoupling layer, for example having substantially the same inner and outer axial extension as the second rubber decoupling layer. That additional reinforcing ply can be placed radially outside or inside the two superposed reinforcing plies or between those two plies.

This first embodiment of a tire is suited, in particular, to tires of H/W aspect ratio higher than 0.55

According to a second embodiment, the ratio between the moduli of elasticity of the second rubber decoupling layer and first layer ranges between 1.2 and 20 and preferably between 1.5 and 10.

In that second embodiment, it is the first rubber decoupling layer, arranged in the center zone of the two reinforcing plies, which has a low modulus of elasticity, less than that of the rubber decoupling layer arranged in the lateral zone of the tire crown.

That second embodiment also has the advantage of making it possible to reduce the running resistance without impairing the drift thrust and lifetime properties. That second embodiment is of particular value with tires of aspect ratio below 0.55.

According to another embodiment of the invention, the two reinforcing plies between which two rubber decoupling layers of different mechanical properties are axially placed are a crown reinforcing ply and a carcass reinforcing ply. That embodiment is particularly advantageous when the belt reinforcement consists of a reinforcing ply whose cords are oriented relative to the circumferential direction at an angle α, ranging between 10° and 70° and of a reinforcing ply formed by parallel cords oriented roughly circumferentially.

DESCRIPTION OF PREFERRED EMBODIMENTS

Figure 1:
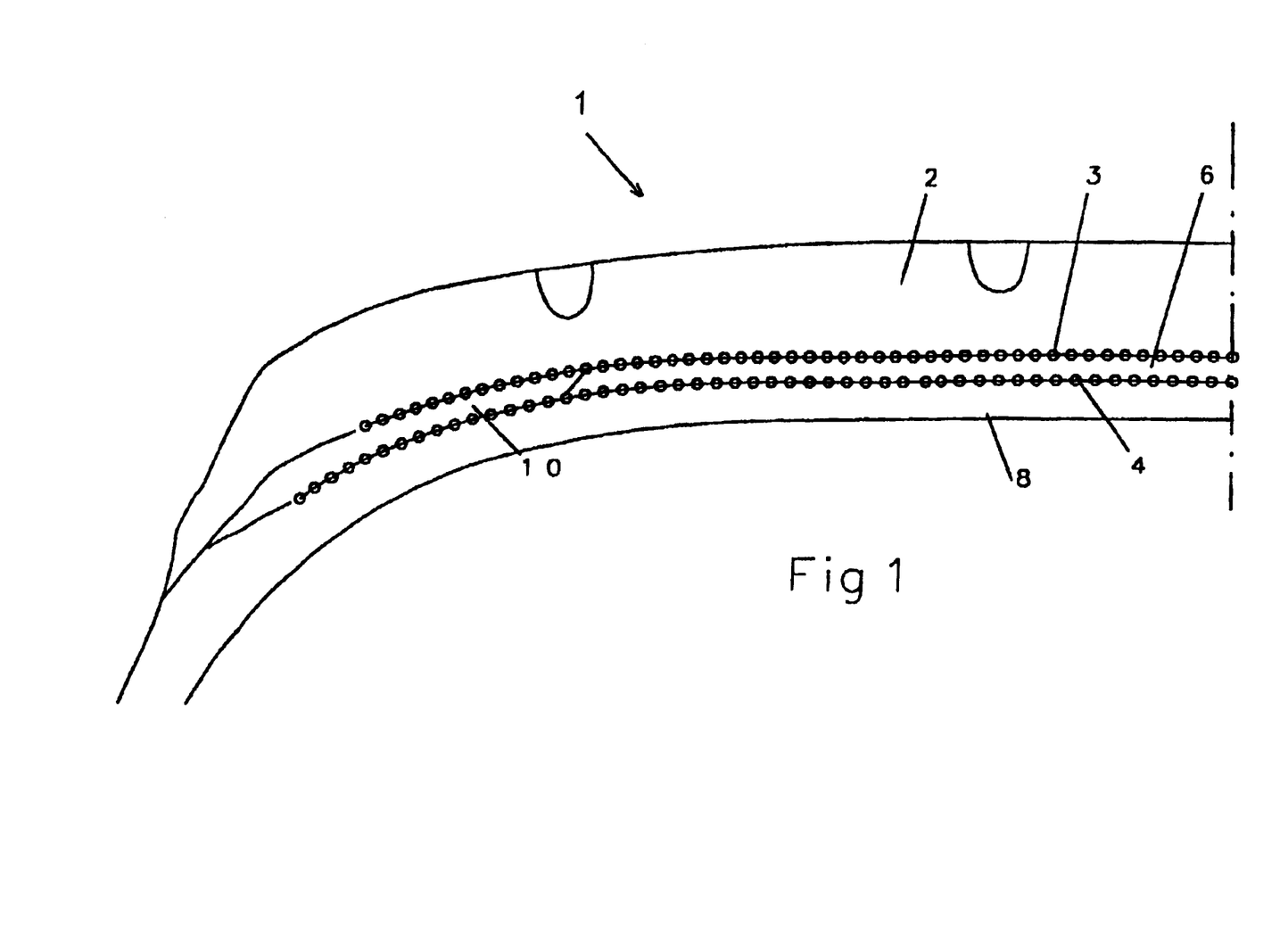
FIG. 1 presents in partial meridian section a tire crown according to the invention.

In FIG. 1, a first embodiment of a tire crown according to the invention is presented schematically in partial meridian section. That crown 1 comprises a tread 2 and two crown reinforcing plies 3 and 4. The two plies are called crossed plies, they are superposed and they consist of cords parallel in each ply and criss-crossed from one ply to the other by forming angles (α, β) with the circumferential direction ranging between 10 and 70°. Between the two plies 3 and 4 there are two rubber decoupling layers, layer 6 in the center part of the plies and layer 10 in the lateral part of the plies. The two rubber decoupling layers 6 and 10 are both in contact with the cords of the two plies 3 and 4. The boundary of separation between the two layers 6 and 10 is preferably beveled.

Radially below ply 4, in the zone referenced 8, the crown 1 contains a radial carcass reinforcement not represented.

The cords of plies 3 and 4 are arranged so that they have no contact with each other.

The first rubber decoupling layer 6 usually has a modulus of elasticity ranging between 10 and 15 MPa.

In the lateral part of the crown, the cords of the two plies 3 and 4 are in contact with a second rubber decoupling layer 10 of modulus of elasticity less than that of the first layer. The ratio of moduli ranges between 0.05 and 0.8 and preferably between 0.4 and 0.6 and more preferably between 0.5 and 0.7. That layer of lower modulus limits the amplitude of the maximum shear stresses at the ends of the plies and therefore limits the energies dissipated by hysteresis on rolling.

Figure 2:
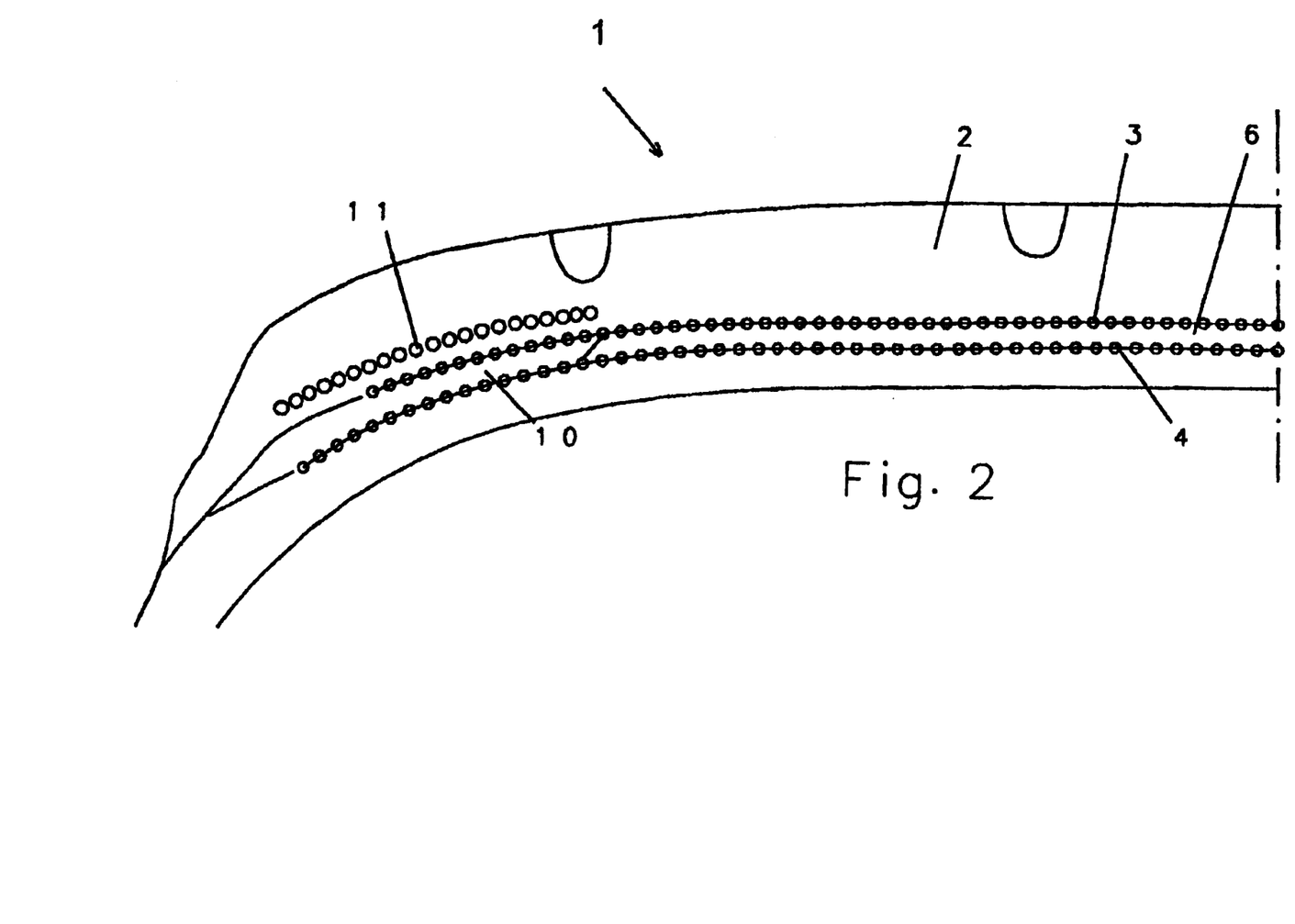
FIG. 2 presents in partial meridian section a working variant of the tire crown of FIG. 1.

FIG. 2 presents a working variant of the tire crown of FIG. 1, in which a partial ply 11 has been added. That ply 11 consists of cords oriented in the circumferential direction of the tire. Those cords can be of textile material, aramide, polyester, nylon, glass fiber or wire.

Ply 11 is placed radially outside the two plies 3 and 4 and axially extends just roughly above the two lateral ends of plies 3 and 4, for example having substantially the same outer axial extension as the axially widest ply 4. That ply has the advantage of limiting the amplitude of the shear stresses between the ends of both plies 3 and 4 and thus of preserving and even increasing the drift thrust and lifetime (in the sense of endurance) properties, while having substantially improved the running resistance of the tire.

Figure 3:
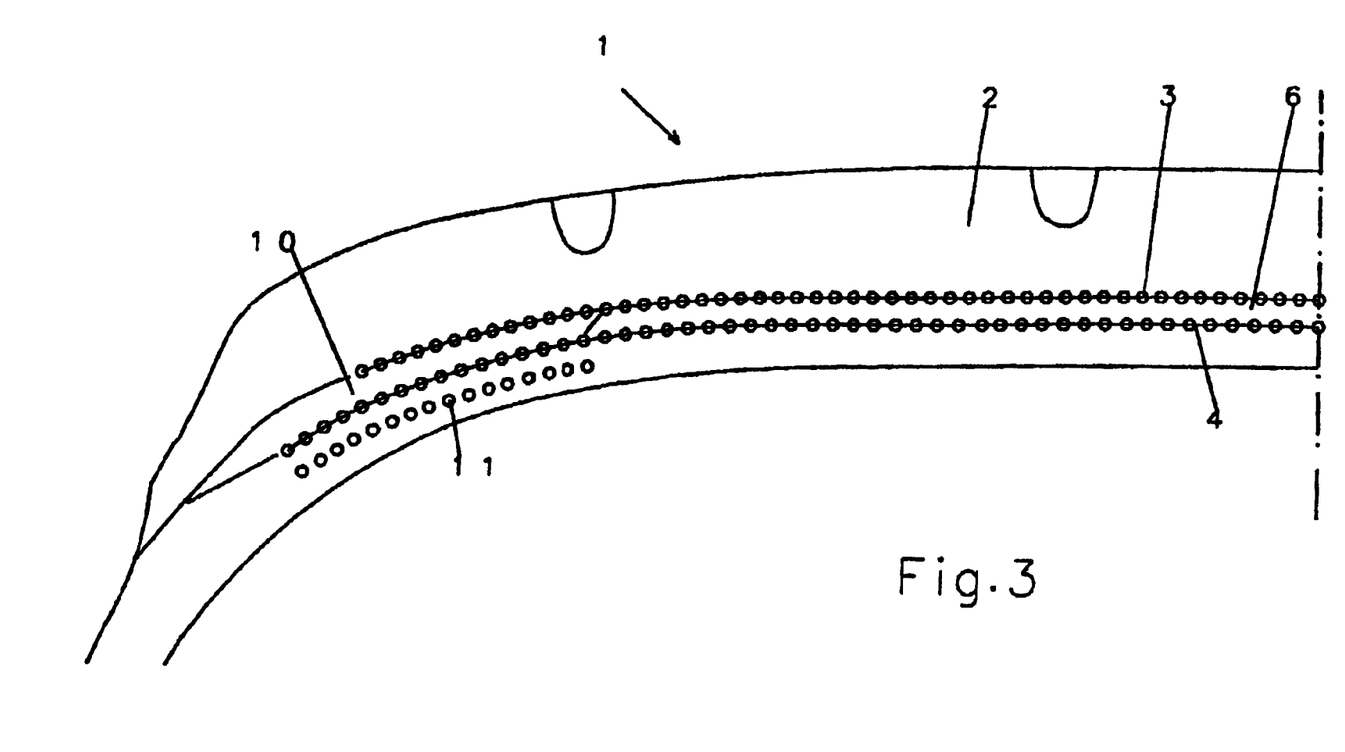
FIG. 3 presents in partial meridian section a working variant of the tire crown of FIG. 2.
Figure 4:
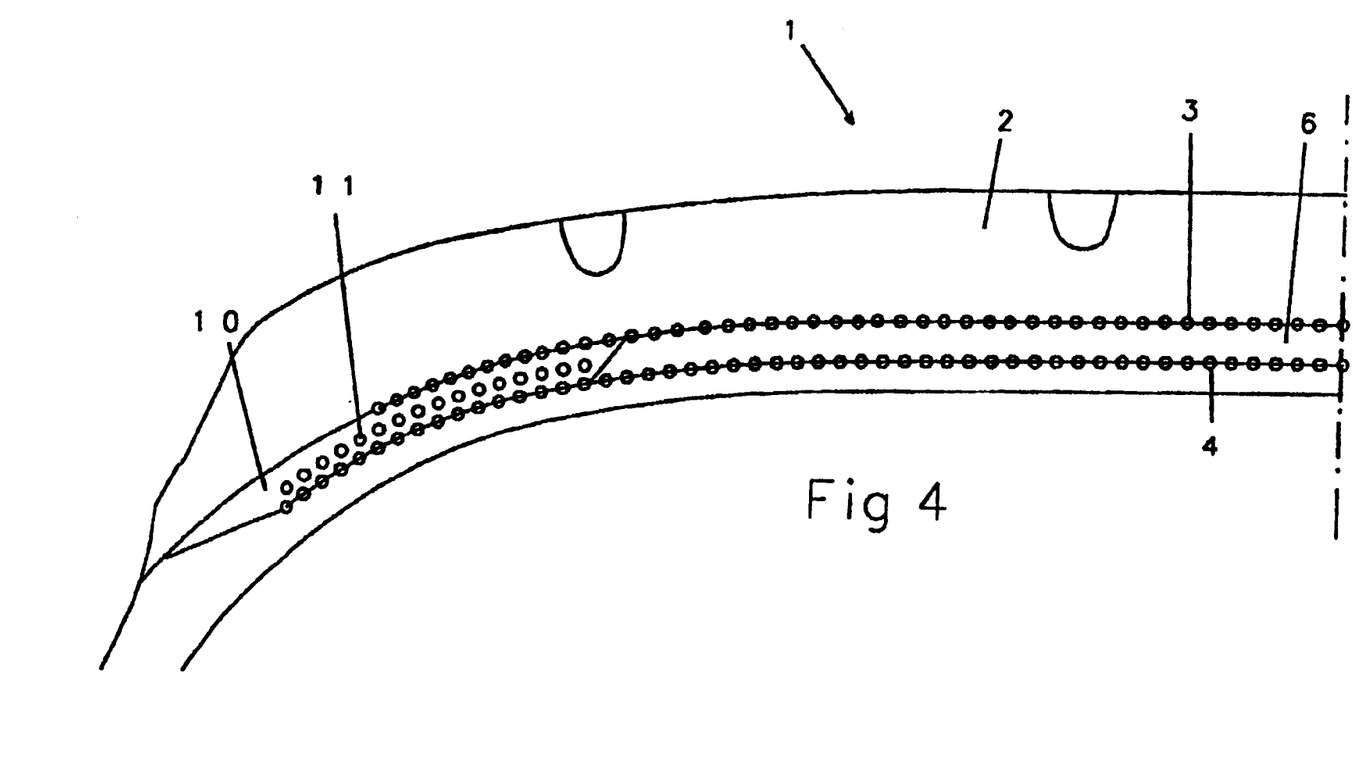
FIG. 4 presents in partial meridian section a second working variant of the tire crown of FIG. 2.

That ply 11 can also be placed radially inside the two plies 3 and 4 (FIG. 3) as well as radially between the two plies 3 and 4 (FIG. 4).

This embodiment with a rubber decoupling layer of lesser modulus and low hysteresis between the two crossed reinforcing plies and at least one of the lateral ends of the crown is particularly suited to tires of H/W (height divided by width) aspect ratio higher than 0.55.

According to another embodiment of the invention, a substantial gain in drift thrust of the tires can also be obtained by inverting the ratio of moduli of elasticity between the first and second layers. The layer of higher modulus of elasticity is thus placed at the lateral ends of the crown and that of lower modulus and lower hysteresis is placed in the center part between the two crossed reinforcing plies 3 and 4.

The rubber decoupling layers arranged toward the lateral ends of the crown have a length of contact with the cords of the crossed reinforcing ply of least axial width, ply 3, which must be axially greater than 5 mm and preferably greater than 20 mm in order to be effective. But it is not necessary to increase that contact length beyond ⅓ of the axial width of ply 3.

This second embodiment is particularly well suited to tires of aspect ratio below 0.55.

The 175/70-13 tires were made with the following configurations:

Control A contained a wire crown (in 6.23 NF cords at 80 f/dm oriented at 23°) with a single rubber decoupling layer between both plies 3 and 4 of modulus of elasticity 12 MPa;

Tire B with two rubber decoupling layers between the two crossed reinforcing plies, layer 6 of modulus of elasticity 12 MPa and layer 10 of modulus of elasticity 5 MPa;

Tire C, second control, similar to tire A, but with a single rubber decoupling layer between both plies 3 and 4, of modulus of elasticity 5 MPa;

Tire D, similar to tire B, but with, in addition, a ply 11 of Nylon 140*2 cords oriented circumferentially above the lateral ends of the two crossed reinforcing plies.

The tires underwent a rolling resistance test (at 60 km/h, pressure 2.1 bars and load 3500 N). That test measures the energy dissipated on rolling and a favorable result is expressed by a figure below 100. They also underwent a characterization of their drift thrust, that is, of the lateral stress Y developed by the tire on rolling at an applied drift angle 6. An increase of drift thrust is expressed by a figure higher than 100. The test was performed with a load of 3500 N and an inflation pressure of 2 bars.

| Tire | RR | Y(δ) |
|------|-----|------|
| A | 100 | 100 |
| B | 95 | 95 |
| C | 94 | 80 |
| D | 95 | 105 |

Solution B, according to the invention, showed a marked improvement in rolling resistance with a limited reduction of drift thrust.

Solution C presents the same improvement in rolling resistance, but with a much sharper reduction of drift thrust.

Finally, solution D, according to the invention, presents an improvement of tire properties in both tests undergone.

Those tests show the importance of being able to adjust the rigidity and hysteresis of the rubber decoupling layers between the two crossed crown reinforcing plies to the circumferential section of the tire according to the objective of the tire designer.

Figure 5:
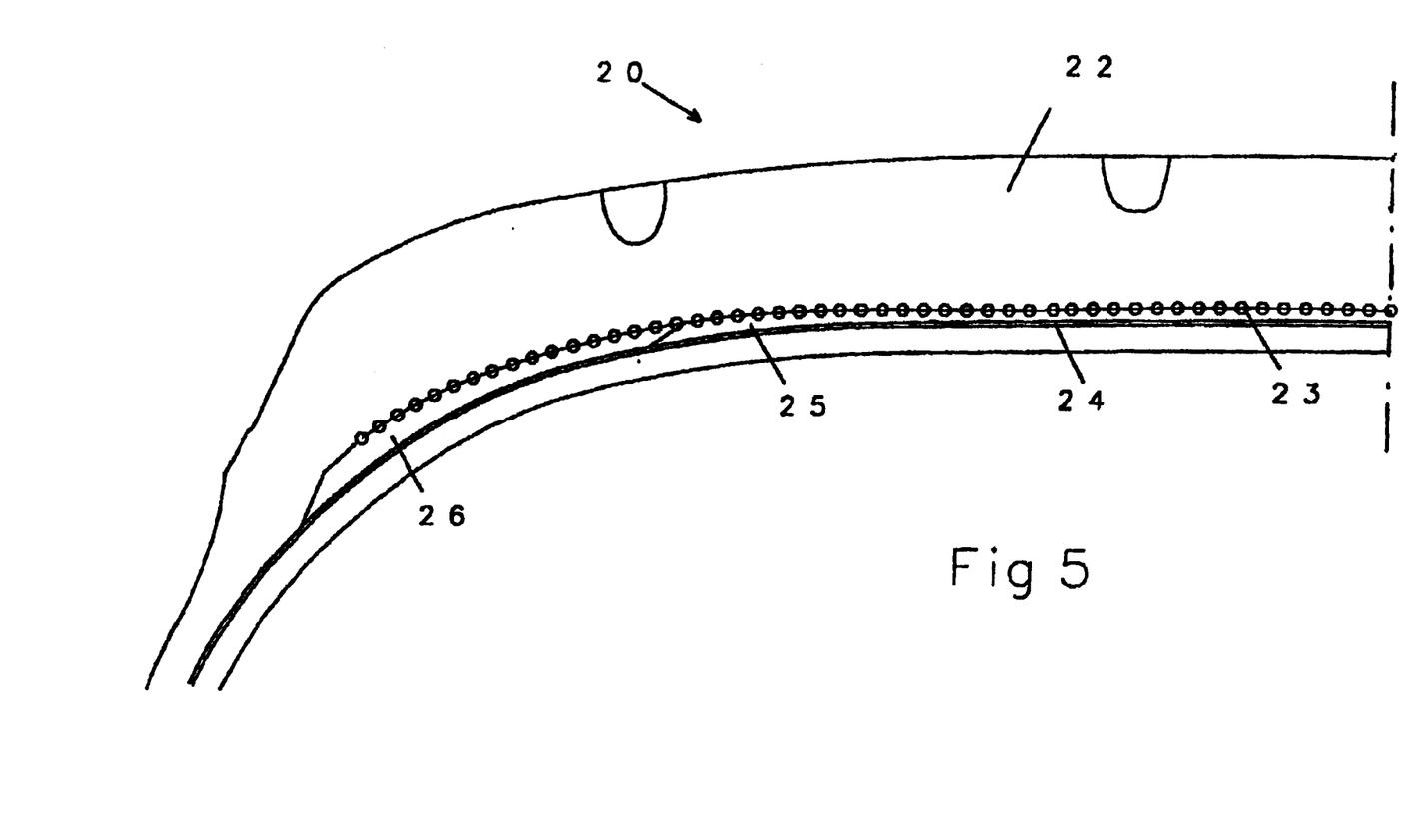
FIG. 5 presents in partial meridian section a second working variant of a tire crown.

FIG. 5 presents another embodiment of the invention. The crown 20 of that tire comprises a tread 22, a crown reinforcing ply 23 whose cords form angles α with the circumferential direction ranging between 10 and 70 degrees and a carcass reinforcing ply 24. Between the two superposed reinforcing plies there is a first rubber decoupling layer 25 and an adjacent second rubber decoupling layer 26. Those layers are directly in contact with the cords of the two reinforcing plies 23 and 24. Layer 25 is placed in the center of the two plies and layer 26 is placed in a lateral zone. Such a tire also has an additional ply in its crown reinforcement, containing circumferentially oriented wire or other cords (not represented in FIG. 5).

The modulus of elasticity and/or the damping ratio tan δ of the two layers 25 and 26 can vary like the two working variants previously described.

Figure 6:
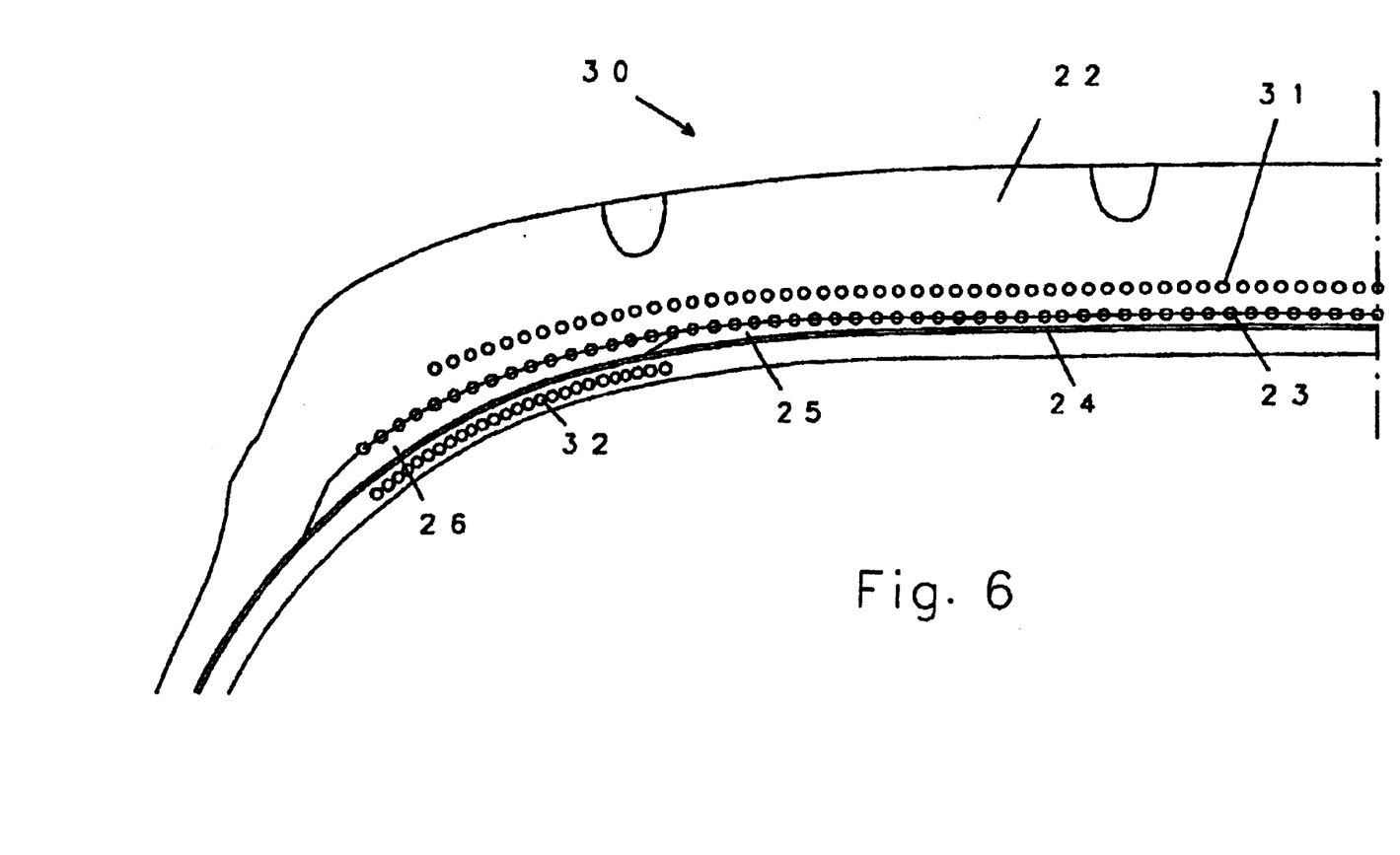
FIG. 6 presents in partial meridian section a working variant of the tire crown of FIG. 5.

In FIG. 6, a working variant 30 of the tire crown of FIG. 5 is presented. In that figure, the additional crown reinforcing ply 31 containing circumferentially oriented wire or other cords is represented. The crown 30 further contains a partial ply 32 placed radially inside both the carcass ply 24 and crown reinforcing ply 23. That ply 32 appreciably improves the drift thrust, running resistance and lifetime properties of the tire when the rubber decoupling layer of lesser modulus and low hysteresis is placed at the lateral ends of the crown.

In the other embodiment consisting of placing the rubber decoupling layer of highest modulus laterally, the partial ply 32 further reinforces the gain in drift thrust of the tire. That applies to tires intended to roll at very high speed.

In manufacturing the different tires according to the invention, it is very advantageous to fabricate them on a rigid core setting the shape of the inner cavity. All the constituents of the tire are applied on that core, in the order required by the final architecture, being directly arranged in their final place, without undergoing shaping at any time of fabrication. That fabrication can, notably, use the devices described in patent EP 0,243,851 for laying the cords of the carcass reinforcement, EP 0,248,301 for laying the crown reinforcements and EP 0,264,600 for laying the rubbery compounds. The rubber decoupling layers are thus preferably made by spiral winding of a rubbery compound section directly on the cords of the radially inner reinforcing ply. The tire can be molded and vulcanized, as explained in U.S. Pat. No. 4,895,692.

We claim:

1. A tire comprising a crown, two sidewalls and two beads, a carcass reinforcement anchored in said beads and a belt reinforcement;

wherein said belt reinforcement comprises two superposed reinforcing rows formed by cords parallel in each row and criss-crossed from one row to the other by forming angles (α, β) with the circumferential direction ranging between 10° and 70°;

wherein between said reinforcing rows, at least two rubber decoupling layers of different mechanical properties are placed axially adjacent;

wherein each of said rubber decoupling layers is in contact with said cords of said reinforcing rows;

wherein a first rubber decoupling layer is placed between the center part of said reinforcing rows;

wherein a second rubber decoupling layer is placed on at least one side of said first rubber decoupling layer and extends at least as far as the corresponding lateral ends of said reinforcing rows; and wherein said belt reinforcement comprises, on the same side as said second rubber decoupling layer, an additional reinforcing row of cords oriented in the circumferential direction and extending axially roughly like said second rubber decoupling layer.

2. The tire of claim 1, wherein the ratio between the moduli of elasticity of said second rubber decoupling layer and said first rubber decoupling layer ranges between 0.05 and 0.8.

3. The tire of claim 1, wherein the ratio between the moduli of elasticity of said second rubber decoupling layer and said first rubber decoupling layer ranges between 0.5 and 0.7.

4. The tire of claim 1, wherein said second rubber decoupling layer has a damping ratio tan δ less than that of said first rubber decoupling layer.

5. The tire of claim 4, wherein said second rubber decoupling layer has a damping ratio tan δ below 0.08 measured at a frequency of 10 Hz, at a temperature of 60° C., and at a peak-to-peak dynamic deformation of 10%.

6. The tire of claim 1, wherein said additional reinforcing row is placed radially outside said reinforcing rows.

7. The tire of claim 1, wherein said additional reinforcing row is placed radially inside said reinforcing rows.

8. The tire of claim 1, wherein said additional reinforcing row is placed radially between said reinforcing rows.

9. The tire of claim 1, wherein the H/W aspect ratio is greater than 0.55.

10. The tire of claim 1, wherein the ratio between the moduli of elasticity of said second rubber decoupling layer and said first rubber decoupling layer ranges between 1.2 and 20.

11. The tire of claim 1, wherein the ratio between the moduli of elasticity of said second rubber decoupling layer and said first rubber decoupling layer ranges between 1.5 and 10.

12. The tire according to claim 1, wherein said additional row of cords has substantially the same axially inner extension as said second rubber decoupling layer.

13. The tire according to claim 1, wherein said additional row of cords has substantially the same axially outer extension as the axially widest superimposed reinforcing row.

14. A tire comprising a crown, two sidewalls and two beads, a carcass reinforcement anchored in said beads and a belt reinforcement;

wherein said belt reinforcement comprises two superposed reinforcing rows formed by cords parallel in each row and criss-crossed from one row to the other by forming angles ($\alpha$, $\beta$) with the circumferential direction ranging between 10° and 70°;

wherein between said reinforcing rows, at least two rubber decoupling layers of different mechanical properties are placed axially adjacent;

wherein each of said rubber decoupling layers is in contact with said cords of said reinforcing rows;

wherein a first rubber decoupling layer is placed between the center part of said reinforcing rows;

wherein a second rubber decoupling layer is placed on at least one side of said first rubber decoupling layer and extends as far as the corresponding lateral ends of said reinforcing rows;

wherein the ratio between the moduli of elasticity of said second rubber decoupling layer and said first rubber decoupling layer ranges between 1.2 and 20; and wherein the H/W aspect ratio is less than 0.55.

15. The tire of claim 14, wherein said first rubber decoupling layer has a damping ratio tan $\delta$ below that of said second rubber decoupling layer.

16. The tire of claim 14, wherein said first rubber decoupling layer has a damping ratio tan $\delta$ below 0.08 measured at a frequency of 10 Hz, at a temperature of 60° C., and at a peak-to-peak dynamic deformation of 10%.

17. The tire of claim 14, wherein the zone of contact between said cords of said reinforcing row whose axial width is the smaller of the two and said second rubber decoupling layer is axially greater than 5 mm.

18. A tire according to claim 14, in which the zone of contact between said cords of said reinforcing row whose axial width is the smaller of the two and said second rubber decoupling layer ranges axially between 20 mm and ⅓ the axial width of said reinforcing row.

19. The tire of claim 14, wherein each second rubber decoupling layer extends axially more than 3 mm beyond the lateral ends of said cords of said reinforcing rows.

20. The tire of claim 14, wherein the ratio between the moduli of elasticity of said second rubber decoupling layer and said first rubber decoupling layer ranges between 1.5 and 10.

* * * * *